(12) United States Patent
Fuh et al.

(10) Patent No.: US 9,176,336 B2
(45) Date of Patent: Nov. 3, 2015

(54) LIQUID CRYSTAL LIGHT VALVE AND METHOD FOR MANUFACTURING THE SAME

(71) Applicant: National Cheng Kung University, Tainan (TW)

(72) Inventors: Ying-Guey Fuh, Tainan (TW); Yuan-Di Chen, Tainan (TW); Ko-Ting Cheng, Chiayi (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 173 days.

(21) Appl. No.: 13/707,273

(22) Filed: Dec. 6, 2012

(65) Prior Publication Data

US 2013/0148074 A1 Jun. 13, 2013

(30) Foreign Application Priority Data

Dec. 7, 2011 (TW) .............................. 100145162 A

(51) Int. Cl.
| | |
|---|---|
| *G02F 1/13* | (2006.01) |
| *G02F 1/1337* | (2006.01) |
| *G02F 1/1333* | (2006.01) |
| *G02F 1/137* | (2006.01) |

(52) U.S. Cl.
CPC .......... *G02F 1/1333* (2013.01); *G02F 1/13378* (2013.01); *G02F 1/133711* (2013.01); *G02F 2001/13756* (2013.01)

(58) Field of Classification Search
CPC ................... G02F 1/133711; G02F 1/133707; G02F 2001/133776
USPC .......................................... 349/127, 193, 187
See application file for complete search history.

(56) References Cited

U.S. PATENT DOCUMENTS 5,579,140 A * 11/1996 Yamahara et al. ............ 349/124

FOREIGN PATENT DOCUMENTS

| JP | 04-273213 A | 9/1992 |
|---|---|---|
| JP | 05-232457 A | 9/1993 |
| JP | 08-122828 A | 5/1996 |
| JP | 2006-126820 A | 5/2006 |
| TW | 200632408 A | 9/2006 |

* cited by examiner

Primary Examiner — Nathanael R Briggs

(74) Attorney, Agent, or Firm — Muncy, Geissler, Olds & Lowe P.C.

(57) ABSTRACT

The present invention relates to a liquid crystal light valve comprising: a first substrate where a first polymer layer is formed thereon; a second substrate where a second polymer layer is formed thereon, the first polymer layer is opposite to the second polymer; and a liquid crystal material layer filled in between the first polymer layer and the second polymer layer, wherein the first polymer layer and the second polymer layer have a roughened surface, and the roughened surface is disposed between the first polymer layer and the liquid crystal material layer, or between the second polymer layer and the liquid crystal material layer.

8 Claims, 6 Drawing Sheets

LIQUID CRYSTAL LIGHT VALVE AND METHOD FOR MANUFACTURING THE SAME

CROSS-REFERENCE TO RELATED APPLICATIONS

This present application claims the benefit of Taiwanese Patent Application No. 100145162 filed on Dec. 7, 2011. The abovementioned foreign application is herein incorporated by reference in their entirety.

BACKGROUND OF THE INVENTION

1. Field of the Invention

The present invention relates to a liquid crystal light valve and a method for making the liquid crystal light valve thereof, which is an especial liquid crystal light valve adapted for low voltage operation and considerable energy conservation.

2. Description of Related Art

Polymer-dispersed liquid crystal (PDLC) is currently the most dominating application of a scattering light valve, and the operating voltage needed for it ranges approximately between 60 to 70 volts. For the scattering light valve, the liquid crystal light valve is maintained in a light-scattering state so that the light is blocked when there is no interference of externally applied voltage. But when an external voltage is applied on the liquid crystal light valve, the liquid crystal light valve will turn to appear transparent and allow the light to pass through.

For details on the use of liquid crystal light valve, please refer to FIG. 1A-FIG. 1C, which show perspective views of use of liquid crystal light valve. As shown in FIG. 1A, the light cannot pass through the liquid crystal light valve 101 when no external operating voltage is applied onto the liquid crystal light valve 101. Under this condition, it is not possible to see any object through the liquid crystal light valve 101. On the other hand, when an external voltage is applied (e.g. by applying an operating voltage of 30 volts), the liquid crystal light valve 101 will begin to show light transmission. As shown in FIG. 1B, when part of light passes through a liquid crystal light valve 101, the view of the object behind the liquid crystal light valve 101 can be roughly seen.

Moreover, when the operating voltage is increased to about 60~70 volts, the light transmittance of liquid crystal light valve 101 will be correspondingly increased to its maximum level. Under the situation as shown in FIG. 1C, the liquid crystal light valve 101 can permit more light to pass through, and making the view of the object at the rear of the liquid crystal light valve 101 more clear to be seen.

However, there are still many drawbacks can be found in the abovementioned known liquid crystal light valve 101. For example, liquid crystal light valve 101 of the known art would require exceptionally high operating voltage (for instance, 60 to 70 volts for operating voltage, as described), such undertaking would mean consumption of a great deal of energy to keep the liquid crystal light valve 101 of the known art running. Furthermore, known liquid crystal light valve 101 requires a long response time. That is, when the external operating voltage is adjusted from its original state, the light transmittance of the liquid crystal light valve 101 will not be able to response immediately to the operating voltage that has changed, and adjust itself accordingly. In addition to this, the known liquid crystal light valve 101 also faces a viewing angle related problem, in which the light valve is not suitable for all viewing angels.

In view of the above, although liquid crystal light valve has excellent properties to offer, it is still restricted by numerous drawbacks and cannot find public popularity. As a result, there is a need in the industry for a novel liquid crystal light valve, one such that could improve on the particular disadvantages so as to make the liquid crystal light valve more acceptable for use in application.

SUMMARY OF THE INVENTION

An object of the present invention is to provide a liquid crystal light valve, which can operate with low voltage to significantly conserve on energy consumption.

Another object of the present invention is to provide a liquid crystal light valve, one that is isolated from polarizing effect, independent of need for polarizer, and has a simple manufacturing process, short response time, high contrast ratio, and others.

Yet another object of the present invention is to provide a method for making a liquid crystal light valve such that the production cost for making liquid crystal light valve can be greatly reduced by means of a simple manufacturing process.

In order to achieve the abovementioned object, a liquid crystal light valve of the present invention is provided, comprising: a first substrate, the first substrate includes a first polymer layer; a second substrate, the second substrate includes a second polymer layer, and the first polymer layer and the second polymer layer are disposed opposite to each other; and a liquid crystal material layer, the liquid crystal material layer is interposed between the first polymer layer and the second polymer layer; wherein, the first polymer layer and the second polymer layer have a roughened surface, and the roughened surface is situated between the first polymer layer and the liquid crystal material layer, or between the second polymer layer and the liquid crystal material layer.

In the current invention, it is preferred to subject the first polymer layer and the second polymer layer to a heating process, and subsequently to a cooling process in order to form the abovementioned roughened surface. It is of particular interest to note here that in the above heating process, the first polymer layer and the second polymer layer are preferred to dissolve in the liquid crystal material layer, and the liquid crystal material layer is preferred to be separated in the cooling process and attached onto the first polymer layer and the second polymer layer. In addition, in the abovementioned heating process it is preferred to heat the temperature to exceed the phase transition point of the liquid crystal material layer.

Also, there is no limitation on the choice of liquid crystal of the liquid crystal material layer. The liquid crystal material is preferred to be a nematic liquid crystal, a semantic liquid crystal, or a cholesteric liquid crystal. More preferably, the liquid crystal material is a nematic liquid crystal.

In addition, there is also no limitation on the choice of substrate for the abovementioned first substrate and the second substrate. The first substrate is preferred to be a glass substrate, or a flexible substrate. The second substrate is preferred to be a glass substrate, a flexible substrate. According to the above description, the first substrate and the second substrate can both use glass substrates or flexible substrates at the same time, or one of them can use glass substrate and the other can use flexible substrate. Further, the glass substrate is not limited in any form, which is preferred to be an indium tin oxide (ITO) conductive glass, an indium zinc oxide (IZO) conductive glass, a tin oxide ($SnO_2$) conductive glass, or a zinc oxide (ZnO) conductive glass.

Materials making up the first polymer layer and the second polymer layer are also not restricted. However, the materials making the first polymer layer and the second polymer material are preferred to be poly(N-vinyl carbazole) for the method of making the liquid crystal light valve of the present invention.

According to the liquid crystal light valve of the present invention, the operating voltage is preferred to be between 0V and 20V, and more preferred to be between 0V and 18V. In addition, the light transparency is preferred to be between 0% and 80%. A skilled person would be able to know based on the range of operating voltage that the operating voltage required for the liquid crystal light valve is low, and therefore can help to conserve energy consumption.

A liquid crystal light valve preparation method of the present invention is provided for achieving the above object, which comprises the following steps: (A) providing a first substrate and a second substrate, the first substrate and the second substrate each forms respectively into a first polymer layer and a second polymer layer, and there is interposed with a liquid crystal material layer between the first polymer layer and the second polymer layer; (B) executing to a heating process; and (C) executing to a cooling process to make the first polymer layer and the second polymer layer to form a roughened surface, and the roughened surface is interposed between the first polymer layer and the liquid crystal material layer or between the second polymer layer and the liquid crystal material layer.

In step (A), it is preferred to make a liquid crystal cell from a first substrate and a second substrate, and to fill the above-mentioned liquid crystal material layer inside the liquid crystal cell. Next, the type of the liquid crystal used in the liquid crystal material layer is not particularly restricted, the liquid crystal material layer is preferred to be a nematic liquid crystal, a sematic liquid crystal, or a cholesteric liquid crystal, however, it is more preferred to be a nematic liquid crystal.

Then, the heating temperature in step (B) is preferred to be between 50° C. to 150° C. It is of particular interest here to point out that the heating process works to exceed the phase transition point of the liquid crystal material layer. Then, the first polymer layer and the second polymer layer formed between the first substrate and the second substrate are preferred to dissolve in the liquid crystal material layer during the heating process of step (B). In addition, first polymer layer and the second polymer layer dissolved in the liquid crystal material layer are preferred to be separated out and become attached to the first polymer layer and the second polymer layer.

Otherwise, the first substrate and the second substrate in the above description are not particularly restricted to a specific type of substrate. The first substrate is preferred to be a glass substrate, or a flexible substrate. And the second substrate here is preferred to be a glass substrate, or a flexible substrate. According to the above description, the first substrate and the second substrate can at the same time be selected as glass substrates or flexible substrates, and can be set up to be one being a glass substrate and the other being a flexible substrate. The glass substrate is not particularly restricted to a specific form, and is preferred to be an indium tin oxide (ITO) conductive glass, an indium zinc oxide (IZO) conductive glass, a tin oxide ($SnO_2$) conductive glass, or a zinc oxide (ZnO) conductive glass.

The material for the first polymer layer and the second polymer layer are not restricted, however, in the preparation method for a liquid crystal light valve of the current invention, the first polymer layer and the second polymer layer are preferred to be [poly(N-vinyl carbazole)]. As described in step (A), the first polymer layer and the second polymer layer are formed on the first substrate and the second substrate. It should be noted here that there is no limitation on the method of forming the first polymer layer and the second polymer layer. However, the method is preferred to be spin coating, dip coating, spraying, ink jet printing, roller printing, or slit coating.

DETAILED DESCRIPTION OF THE PREFERRED EMBODIMENT

Hereafter, examples will be provided to illustrate the embodiments of the present invention. Other advantages and effects of the invention will become more apparent from the disclosure of the present invention. Other various aspects also may be practiced or applied in the invention, and various modifications and variations can be made without departing from the spirit of the invention based on various concepts and applications.

EXAMPLE 1

Figures 1A, 1B, 1C:
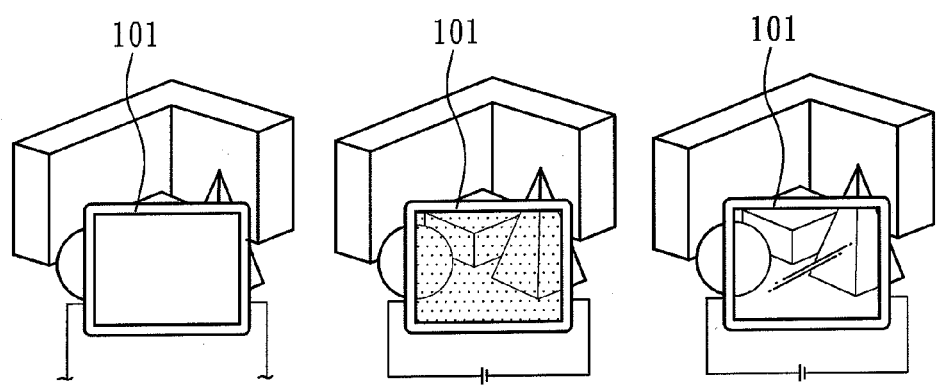
FIG. 1A-FIG. 1C are perspective diagrams showing the use the liquid crystal light valve according to the current invention.
Figure 2:
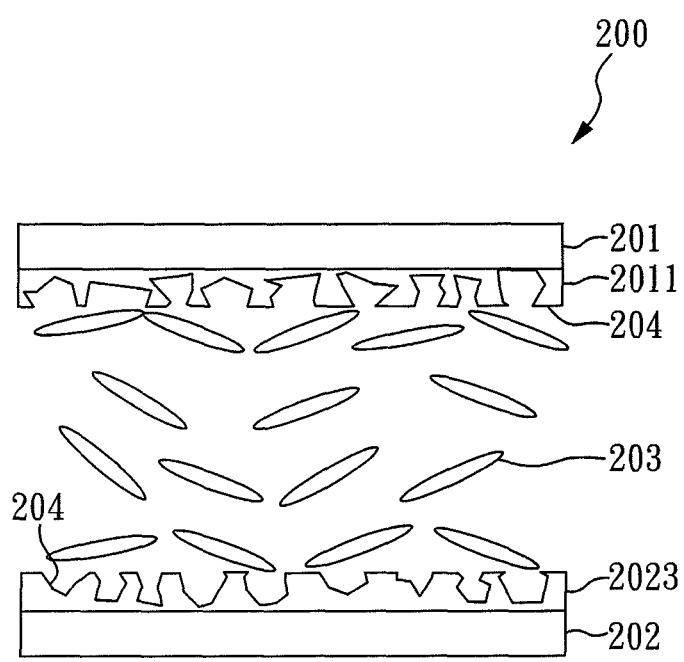
FIG. 2 shows the liquid crystal light valve of the embodiment 1 of the current invention.

For the liquid crystal light valve of the embodiment 1 of the current invention, please refer to FIG. 2. FIG. 2 shows the liquid crystal light valve of the embodiment 1 of the current invention. As shown in FIG. 2, the liquid crystal light valve 200 of embodiment 1 of the current invention comprises: a first substrate 201, a second substrate 202, and a liquid crystal material layer 203.

Next, a first polymer layer 2011 is formed on the first substrate, and a second polymer layer 2021 is formed on the second substrate. The first polymer layer 2011 and the second polymer 2021 are disposed in opposite direction to each other. Further as shown in FIG. 2, the liquid crystal material layer 203 is filled in between the first polymer layer 2011 and the second polymer layer 2021.

To be noted in FIG. 2, the first polymer layer 2011 and the second polymer layer 2021 each has a roughened surface 204, and the roughened surface 204 is interposed between the first polymer layer 2011 and the liquid crystal material layer 203 or between the second polymer layer 2021 and the liquid crystal material layer 203.

The first substrate 201 and the second substrate 202 are not restricted to any substrate, but with the liquid crystal light valve of the embodiment 1 of the current invention, the first substrate 201 and the second substrate 202 can be selected as glass substrates, or flexible substrates. The glass substrate can be for example, indium zinc oxide (IZO) conductive glass, tin oxide ($SnO_2$) conductive glass, or zinc oxide (ZnO) conductive glass. In the liquid crystal light valve of the embodiment 1 of the current invention, the first substrate 201 and the second substrate 202 are glass substrates, and the glass substrates are indium tin oxide conductive glasses.

Besides, the first polymer layer 2011 and the second polymer layer 2021 above can be selected as [poly(N-vinyl carbazole)]. The above description reveals that the first polymer layer 1011 and the second polymer layer 2021 each forms on the first substrate 201 and the second substrate 202. With it, the method of forming the first polymer layer 2011 and the second polymer layer 2021 include spin coating, dip coating, spraying, ink jet printing, roller printing, or slit coating. For the crystal light valve of embodiment 1 of the current invention, spin coating is used to form the first polymer layer 2011 and the second polymer layer 2021.

According to the liquid crystal light valve of embodiment 1 of the current invention, the operating voltage is preferred to be between 0V and 20V, more preferred to be between 0V to 18V. In addition, the transparency is preferred to be between 0% to 80%, and for the liquid crystal light valve of embodiment 1 of the current invention, light transparency of liquid crystal light valve is 76.7%, and it will be understood based on the operating voltage range that the liquid crystal light valve of embodiment 1 of the current invention, the required operating voltage is much lower than that required for traditional liquid crystal light valve, which therefore can contribute to saving on energy consumption.

EXAMPLE 2

Figure 3:
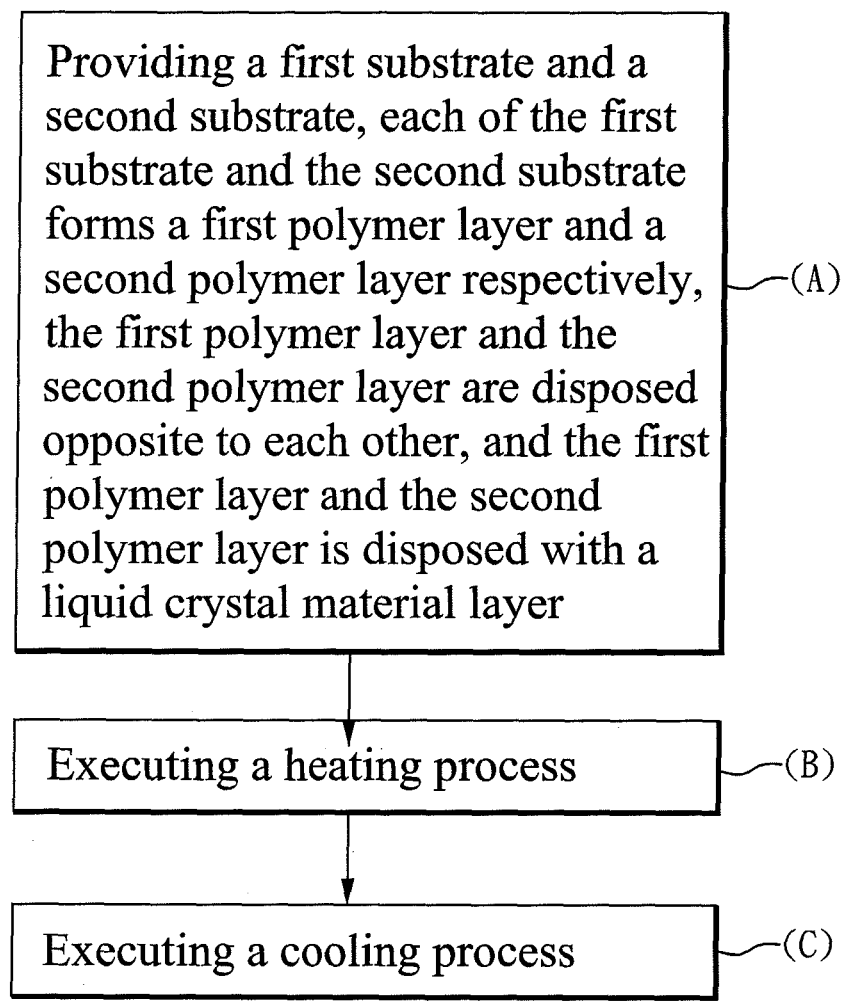
FIG. 3 is a flowchart diagram showing the preparation method for the liquid crystal light valve of the embodiment 2 of the current invention.

Please refer to FIG. 3 for the preparation method for the liquid crystal light valve of embodiment 2 of the current invention. FIG. 3 is a flowchart diagram showing the preparation method for the liquid crystal light valve of the embodiment 2 of the current invention, which comprises the following steps: (A) providing a first substrate and a second substrate, the first substrate and the second substrate each forms respectively into a first polymer layer and a second polymer layer, and there is interposed with a liquid crystal material layer between the first polymer layer and the second polymer layer; (B) executing to a heating process; and (C) executing to a cooling process to make the first polymer layer and the second polymer layer to form a roughened surface, and the roughened surface is interposed between the first polymer layer and the liquid crystal material layer or between the second polymer layer and the liquid crystal material layer.

Below, a more detailed description for the preparation method for a liquid crystal light valve of the current invention is provided.

Figure 4A:
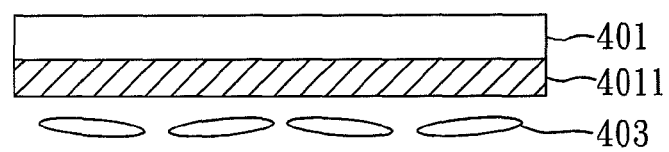
FIG. 4A-4C show the preparation method for making the liquid crystal light valve of the embodiment 2 of the current invention.
Figure 4B:
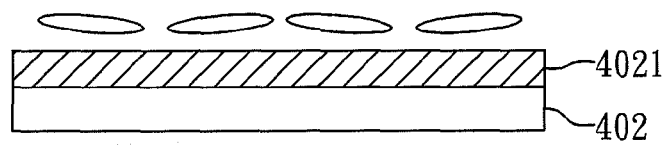
Figure 4B:
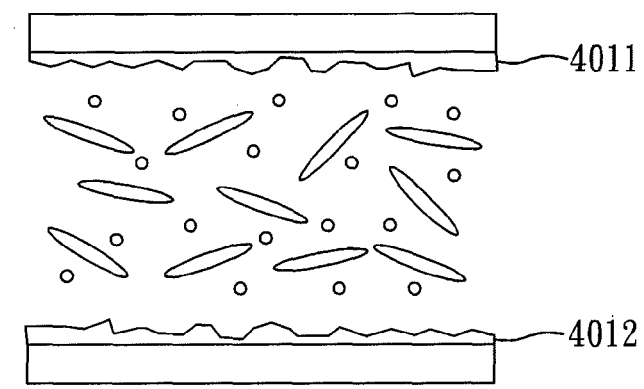
Figure 4C:
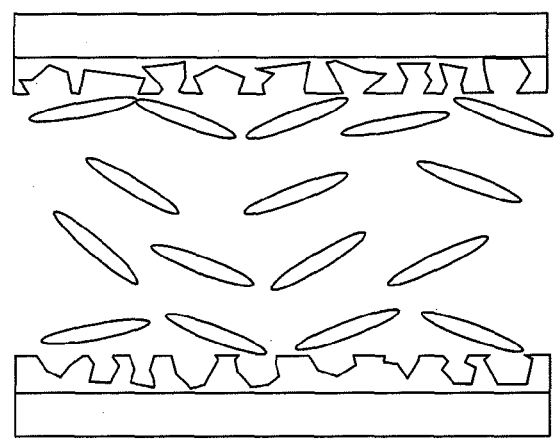

In reference to FIG. 4A-FIG. 4C, FIG. 4A-FIG. 4C show the preparation method for making the liquid crystal light valve of the embodiment 2 of the current invention. Referring now to FIG. 4A, first, a first substrate 401 and a second substrate 402 are provided. In the preparation method for a liquid crystal light valve of embodiment 2 of the current invention, the first substrate 401 is a glass substrate, and which is an indium tin oxide conductive glass, and the second substrate 402 is a flexible substrate. Then, the first substrate 401 and the second substrate 402 each forms a first polymer layer 4011 and a second polymer layer 4021, and the first polymer layer 4011 and the second polymer layer 4021 are disposed in opposite direction to each other.

Of particular interest here is that the material making up the first polymer layer 4011 and the second polymer layer 4021 is [poly(N-vinyl carbazole)], and each of the first polymer layer 4011 and the second polymer layer 4021 forms on the first substrate 401 and the second substrate 402 through the dip coating method. In addition, a liquid crystal material layer 403 is interposed between the first polymer layer 4011 and the second polymer layer 4021. Then, the type of liquid crystal for the liquid crystal layer 403 is a nematic liquid crystal.

Of further interest here is that the in the preparation method for the liquid crystal light valve of embodiment 2 of the current invention, the first substrate and the second substrate 402 are worked to form a liquid crystal cell first before filling up the container with liquid crystal material layer 403. However, this step is not a required step for the current invention.

The next step is to subject the liquid crystal cell to a heating process. In reference to FIG. 4B, when the liquid crystal cell undergoes a heating process, the heating process is preferred to raise the temperature to exceed the phase transition point of the liquid crystal material layer 403, so as to make the liquid crystal material have an isotropic arrangement. By this, the first polymer layer 4011 and the second polymer layer 4021 will dissolve in each isotropic liquid crystal material layer 403. Importantly, the circle in FIG. 4B is poly(N-vinyl carbazole). Also, the temperature in the heating process is between 50° C. and 150° C., and in the preparation method for liquid crystal light valve of embodiment 2 of the current invention, the temperature in the heating process is 60° C.

Next, the liquid crystal cell is subjected to a cooling process, which entails lowering the temperature of the liquid crystal cell to room temperature. When the temperature of the liquid crystal cell is lowered to room temperature, the poly (N-vinyl carbazole) dissolved in the liquid crystal material layer 403 will be separated out from the liquid crystal material layer 403, and will be attached to the first polymer layer 4011 and the second polymer layer 4021. By way, the first polymer layer 4011 and the second polymer layer 4021 work form the roughened surface shown in FIG. 4C.

As described above, the poly(N-vinyl carbazole) dissolved in the liquid crystal material is separated out and attached to two edges of the first substrate and the second substrate to result in a roughened, uneven structure shown in FIG. 4C. This structure can make the liquid crystal material arrangement into a disordered state, which can allow light scattering. By this, according to the liquid crystal light valve made from the preparation method of current invention, when there is no external provision of applied voltage, light cannot pass through the liquid crystal light valve. When an external operating voltage is added to the liquid crystal light valve, changes with the liquid crystal of the light valve will become obvious as they respond to the electric field, making the light to pass through light valve.

Figure 5:
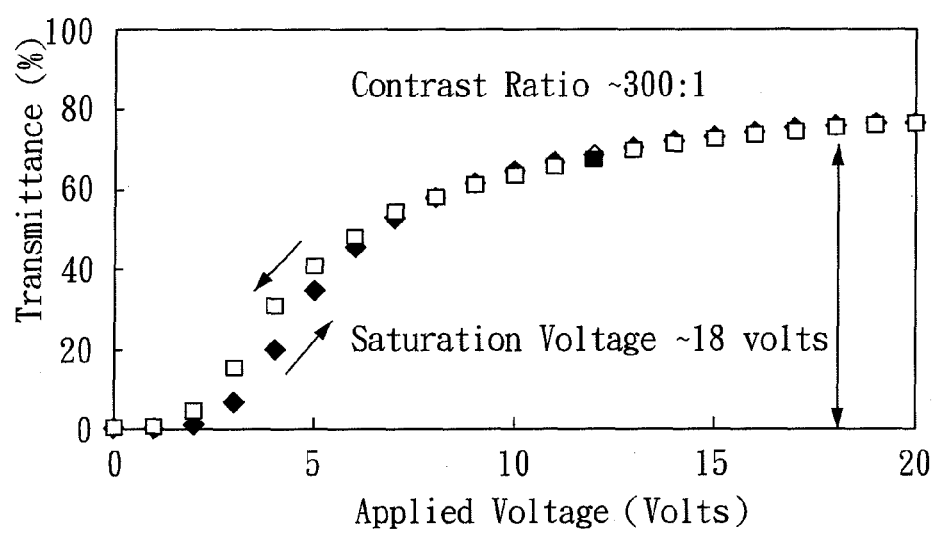
FIG. 5 demonstrates the relationship between externally applied voltage and light transmittance of the liquid crystal light valve provided by the current invention.

With the provision of operating voltage, light transparency of the light valve will increase accordingly; this means that light transparency and scattering of the light can be controlled at a manual level by manipulating operating voltage. With reference now to FIG. 5, FIG. 5 shows the relationship between externally applied voltage and light transmittance of the liquid crystal light valve provided by the current invention. FIG. 5 shows that based on the liquid crystal light valve obtained from the preparation method of the current invention, its efficiency can reach a contrast ratio of 300, an operating voltage about 18 volts, maximum transmittance close to 80%. Therefore, as compared to the known liquid crystal light valve, the operating voltage of the liquid crystal light valve of the current invention can be significantly lowered to only near 20 volts, thereby keeping down by a considerable amount the consumed energy.

Figure 6A:
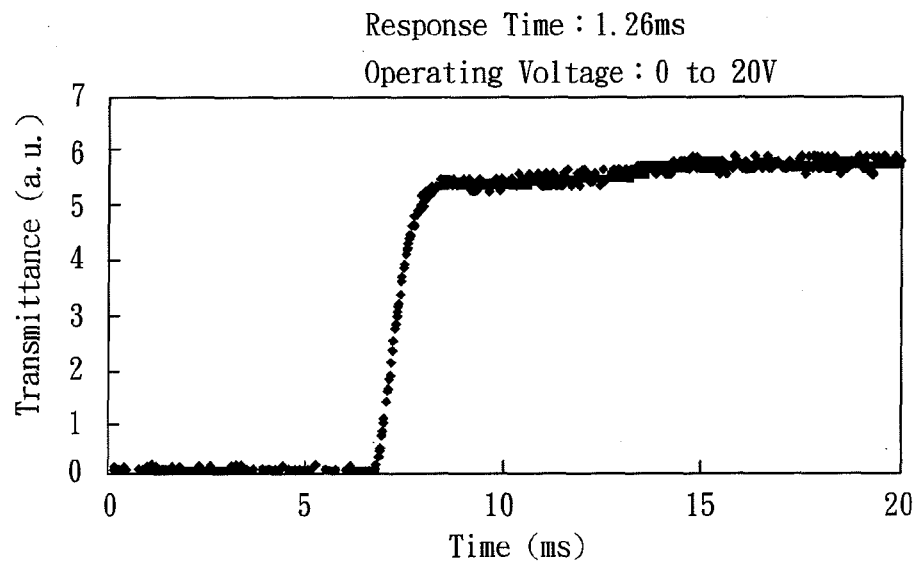
FIG. 6A and FIG. 6B are diagrams showing the response time of the liquid crystal light valve provided by the current invention.
Figure 6B:
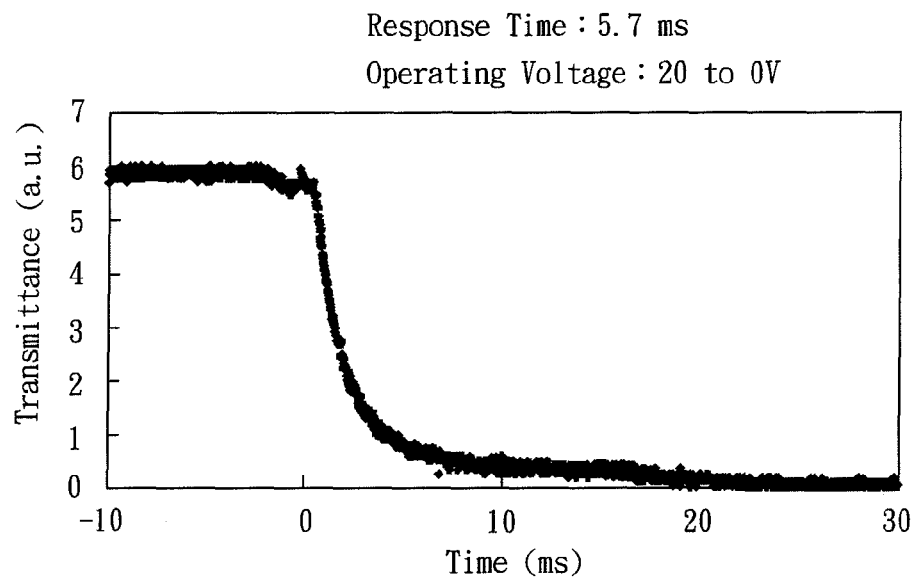

Further reference is directed to FIG. 6A and FIG. 6B, which show diagrams displaying the response time of the liquid crystal light valve of the current invention. FIG. 6A shows response time of the liquid crystal light valve when the external operating voltage rises from 0 volts to 20 volts; FIG. 6B shows the response time of the liquid crystal light valve when the external operating voltage drops from 20 volts to 0 volts.

It can be understood from FIG. 6A, when the external operating voltage rises from 0 volt to 20 volts, it only takes about 1.25 ms for the transmittance of the liquid crystal light valve to increase from its minimum at 10% to its maximum at 90% (as shown in FIG. 6A where the response time is 1.26 ms), and FIG. 6B shows that when the external operating voltage drops from 20 volts to 0 volt, it only takes about 5.7 ms for the transmittance of the liquid crystal light valve to drop from its maximum at 90% to its minimum at 10% (as shown in FIG. 6B where the response time is 5.7 ms).

In addition, the method production of the liquid crystal light valve provided by the present invention is straightforward and requires no execution of complex flow of steps, and only needs low energy consumption in the fabrication process. Therefore, related economic cost for making liquid crystal light valve can be greatly reduced, which is believed to beneficial to mass production.

EXAMPLE 3

The preparation method for the liquid crystal light valve of embodiment 3 of the present invention is similar to that described in embodiment 2, where the difference is at: in the preparation method for the liquid crystal light valve of embodiment 3 of the present invention, the first substrate is a glass substrate, and is zinc tin oxide conductive glass. In addition, the type of liquid crystal for the liquid crystal material layer is cholesteric liquid crystal. Also, the material making up the first polymer layer and the second polymer layer is a cholesteric liquid crystal, and the cholesteric liquid crystal is made from a mixture of E7 type nematic liquid crystal and chiral material. There is no restriction on the type for chiral material, and in the preparation method of liquid crystal light valve of embodiment 3 of the current invention, the chiral material is a CB 15. In addition, the heating process temperature is 80° C.

Other similarities to the preparation method for liquid crystal light valve of embodiment 2 for the current invention will not be further elaborated.

The above embodiment is provided as an example for easy illustration purposes; the scope of protection sought by the present invention should be based on patent claim coverage only, and not limited to only the above embodiments.

What is claimed is:

1. A method for preparing a liquid crystal light valve, comprising the steps of:

(A) providing a first substrate and a second substrate, each of the first substrate and the second substrate forms a first polymer layer and a second polymer layer respectively, the first polymer layer and the second polymer layer are disposed opposite to each other, and the first polymer layer and the second polymer layer is disposed with a liquid crystal material layer;

(B) executing to a heating process; and (C) executing to a cooling process, to make the first polymer layer and the second polymer layer form a roughened surface, and the roughened surface is disposed between the first polymer layer and the liquid crystal material layer or between the second polymer layer and the liquid crystal material layer;

wherein in step (B), the first polymer layer and the second polymer layer dissolve in the liquid crystal material layer; and wherein in step (C), the first polymer and the second polymer dissolved in the liquid crystal material layer are separated out and attached onto the first polymer layer and the second polymer layer.

2. The method for preparing a liquid crystal light valve according to claim 1, wherein in step (A), the first substrate and the second substrate are formed into a liquid crystal cell, and the liquid crystal cell is filled with a liquid crystal material layer.

3. The method for preparing a liquid crystal light valve according to claim 1, wherein in step (A), the liquid crystal material is a nematic liquid crystal, sematic liquid crystal, a cholesteric liquid crystal.

4. The method for preparing a liquid crystal light valve according to claim 1, wherein in step (A), the first substrate and the second substrate are each individually a glass substrate, or a flexible substrate.

5. The method for preparing a liquid crystal light valve according to claim 1, wherein in step (A), the first polymer layer and the second polymer layer are made of [poly(N-vinyl carbazole)].

6. The method for preparing a liquid crystal light valve according to claim 1, wherein in step (A), the method for forming the polymer layer is spin coating, dip coating, spraying, ink jet printing, roller printing, or slit coating.

7. The method for preparing a liquid crystal light valve according to claim 1, wherein in step (B), a heating temperature is between 50° C. and 150° C.

8. The method for preparing a liquid crystal light valve according to claim 1, wherein in step (B), the heating process works to raise a temperature to exceed a phase transition point of the liquid crystal material.

* * * * *